United States Patent
Little, Jr,

[15] 3,650,604
[45] Mar. 21, 1972

[54] INTERFEROMETRIC SCANNING APPARATUS AND METHOD

[72] Inventor: William S. Little, Jr., Rochester, N.Y.

[73] Assignee: Xerox Corporation, Stamford, Conn.

[22] Filed: Oct. 15, 1970

[21] Appl. No.: 80,878

[52] U.S. Cl..................................350/163, 350/3.5, 350/6, 350/320
[51] Int. Cl...................................G02b 27/00, G02b 17/00
[58] Field of Search.....................350/6, 3.5, 7, 162 R, 163, 350/320

[56] References Cited

UNITED STATES PATENTS

| 3,530,442 | 9/1970 | Collier et al. | 350/3.5 |
| 2,091,705 | 8/1937 | Farnsworth | 350/6 |

*Primary Examiner*—David Schonberg
*Assistant Examiner*—Robert L. Sherman
*Attorney*—James J. Ralabate, Albert A. Mahassel and Michael J. Colitz, Jr.

[57] ABSTRACT

Method and apparatus are herein disclosed for exposing a recording plane to a stable interferometric line pattern where the recording plane extends beyond the boundary of the exposure pattern. A beam of highly coherent collimated light is split into at least two beams of light and the beams recombined in the recording plane to create an interference pattern of light and dark fringes. At least one flat glass plate is obliquely repositionable in the unsplit light beam and serves to shift the position of the light beam whereby the beam of light leaving the plate is substantially parallel to the light beam entering the plate. This, in effect, causes the illuminated region in the recording plane to be shifted to a new location in the plane without altering the phase relationship of the individual interference fringes. Thus, each bright fringe remains in a stationary position and only changes in intensity as the exposure pattern is moved in the recording plane.

10 Claims, 5 Drawing Figures

INVENTOR
WILLIAM S. LITTLE

ATTORNEY

Patented March 21, 1972 3,650,604

INTERFEROMETRIC SCANNING APPARATUS AND METHOD

This invention relates to method and apparatus for exposing a recording plane to an interference pattern where the recording plane extends beyond the boundaries of the exposure pattern.

Franks, in U.S. Pat. No. 3,507,564, discloses method and apparatus for producing a diffraction grating by optically etching an interference pattern on a photochemical exposure surface. Basically the diffraction pattern is produced by recombining a previously divided beam of monochromatic light in the plane of the receiving material by techniques well known and practiced in the art. However, the region of exposure in Franks, as in other such interferometric devices, has heretofore been severely limited to the area encompassed by the boundaries of the interference pattern created. Conventional beam scanning techniques cannot be employed to extend the exposure region because any angular motion imparted to the light beams used in creating the interferometric pattern will introduce a phase change in the interference pattern altering the location of the fringe lines.

It is therefore a primary object of this invention to improve method and apparatus for optically producing a uniform and stable interferometric line pattern.

It is a further object of this invention to provide exposure means for producing a stable interferometric line pattern over a region that extends beyond the boundaries of the exposure pattern.

These and other objects of the present invention for producing uniform exposure of a stable interferometric line pattern over an extended exposure plane are attained by providing a source of highly coherent illumination capable of producing a beam of collimated light, splitting the original beam of light into at least two discrete beams, superimposing the discrete beams in the exposure plane to produce an interferometric line pattern, and repositioning the original unsplit beam of light from a first position to a second position substantially parallel to the first position wherein the illuminated region of the recording plane is shifted to a new location without disturbing the phase relationship between the superimposed beams at any point in the recording plane, thus leaving the individual interference fringes stationary.

For a better understanding of the invention as well as other objects and further features thereof, reference is had to the following detailed description to be read in connection with the accompanying drawings, wherein.

Figure 1:
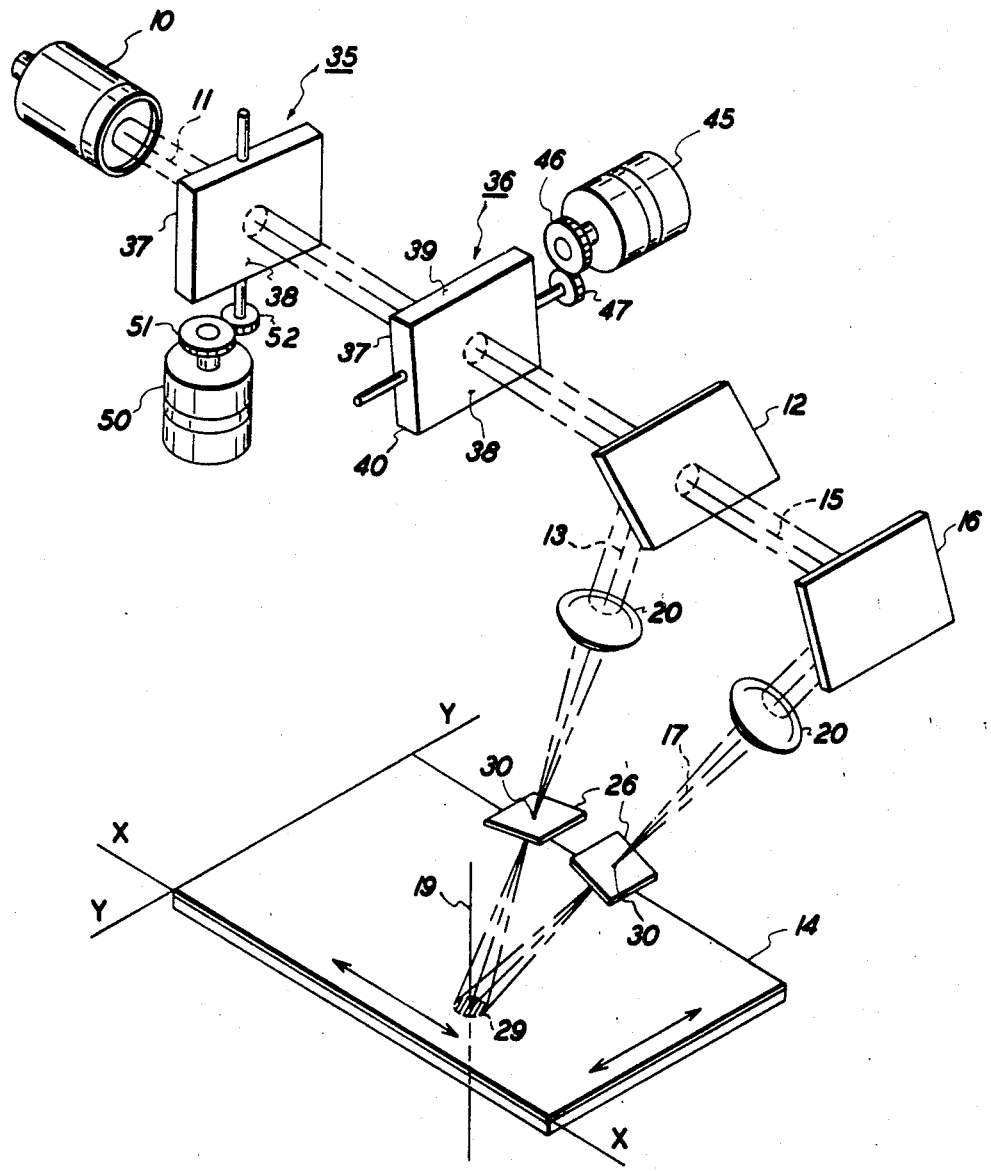
FIG. 1 is a schematic view in perspective of apparatus for producing an interferometric line pattern in accordance with the teachings of the present invention.

Referring now specifically to FIG. 1, there is illustrated a schematic arrangement of apparatus embodying the teachings of the present invention. A point source of light energy 10 is arranged to direct a beam of highly coherent collimated light 11 incident upon a beam splitter 12 wherein a portion of the light energy is redirected along a first optical path 13 towards a recording plane 14 described by the $x$ and $y$ coordinates. The remaining light energy passes through the beam splitter and is redirected by means of reflecting surface 16 along a second optical path 17 towards the recording plane. The beam splitter and the reflecting surface are arranged so that the two redirected light beams are superimposed at the recording plane.

Two identical projection lenses 20 are mounted in each of the optical paths associated with the redirected beams as illustrated in FIG. 1. The lenses serve to both expand the original image in the recording plane and to convert the original planar wave front of light entering the lens to a spherical wave front. The light beams recombine in the recording plane to produce an extremely stable interference pattern in the manner of Fresnel's biprism or Young's double pinhole device.

Any dirt or dust in the beam is capable of diffracting the collimated light and thus introduce unwanted noise in the exposure or recording plane. A spatial filter 26 is positioned in the back focal plane of each lens having a pinhole aperture 30 therein centered about the lenses focal spot. The filter thus prevents most of this extraneous noise from reaching the exposure plane. The filters are preferably the last optical component in the system in order to minimize the amount of extraneous noise that is recorded in the recording plane.

Figure 2:
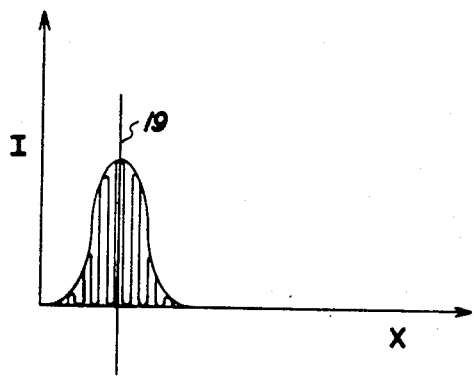
FIG. 2 is a diagrammatic representation of the instantaneous intensity pattern produced in the recording plane of the apparatus shown in FIG. 1.

The laser, because it produces nearly monochromatic light, is preferred as a source of illumination in the practice of the present invention. The energy distribution of most lasers, however, is gaussian in form and therefore unsuited for producing uniform illumination. Even though the light experiences a change in waveform as it moves through the system, the energy distribution of the interference pattern reflects that of the source and is also gaussian in shape. This instantaneous distribution of energy is graphically illustrated in FIG. 2 wherein the intensity (I) of the energy is plotted against displacement from the optical center line 19 of the interference pattern along the (X) coordinates of the recording plane. As can be seen, a great deal of the radiant energy is concentrated about the center of the output image with the energy falling off rapidly as you move away from the center of the image.

The output beam 11 of the illumination source is typical for most lasers in that the beam is relatively narrow, generally being about the same width as an ordinary pencil. The relatively narrow beam must be scanned across the read-out plane in order to accomplish complete exposure thereof. However, conventional scanning techniques cannot be used in the present apparatus because these methods generally involve angularly displacing one or more of the light beams producing a change in the phase relationship between the interfering beams and hence shifting the position of the individual interference fringes.

Means are herein provided for exposing the recording plane of the present apparatus to a moving gaussian shaped intensity pattern without altering the position of the individual interference fringes. Movement of the fringe pattern in the recording plane is herein accomplished by means of a pair of transparent plates, preferably constructed of glass, that are rotatably supported in light beam 11 at a position prior to splitting the beam as illustrated in FIG. 1. Although not necessary for the practice of the present invention, the axis of rotation associated with each of the glass plates is illustrated passing near the optical center line of the beam 11 whereby the plates can be repositioned in the light beam. Each plate is provided with a light receiving surface 37 and a light exit surface 38 that are substantially flat and parallel in relation to each other. When the plates are positioned with the light receiving surfaces normal to the original beam 11, the light rays travel in a straight line from the source to the beam splitter. However, obliquely repositioning either of the plates within the beam laterally shifts the original light in a manner wherein the beam leaving the plate is substantially parallel to the beam entering the plate.

Figure 4:
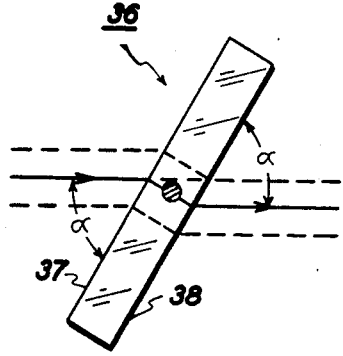
FIG. 4 is an end view of a transparent plate employed in the present apparatus for repositioning the original light beam prior to the splitting of the beam.

As illustrated in FIG. 4, a single ray traversing the obliquely positioned plate act in accordance with Snell's Law at each interface. Although the emerging light beam is parallel to the entering light beam, it nevertheless is laterally displaced some distance therefrom and the displacement distance increases as the angle of incidence ($\alpha$) increases. It has been found experimentally, that by holding the emerging beam parallel to the entering beam in the manner disclosed, the intensity pattern can be shifted in the recording plane without disturbing the positions of the individual interferometric fringe lines.

A test was conducted employing apparatus similar to that herein disclosed in which a single ¼ inch thick glass plate was rotatably supported in the output beam of a laser in the manner described. The edges of the plate were masked with an opaque tape and the plate rotated through the laser beam at approximately 180 r.p.m. by using a motor as a drive means. In this manner, the illuminated area was repeatedly scanned across the recording plane. A portion of the recording plane was then observed under a 500X microscope revealing that the fringe pattern, in the observed region, was extremely stable with no discernable movement being noted in the light and dark fringe areas. The bright fringes remained in a stationary position and only the level of intensity of these fringes changed as the exposure pattern was scanned over the observed region.

Figure 3:
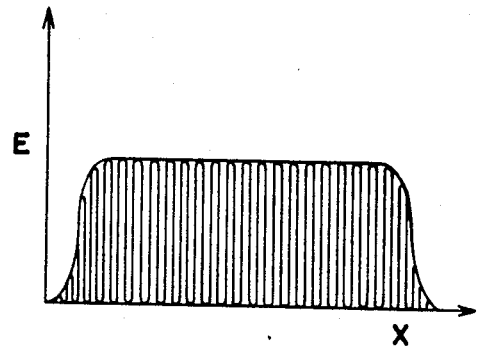
FIG. 3 is a diagrammatic representation of the time average exposure produced in the recording plane of the apparatus shown in FIG. 1.
Figure 5:
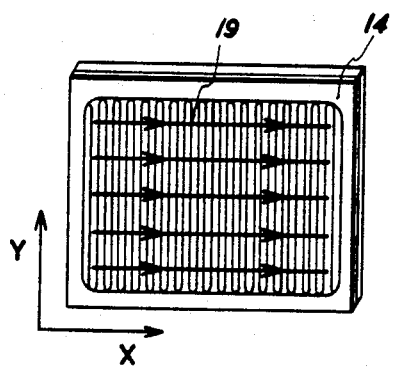
FIG. 5 is a plane view of the recording plane of the apparatus illustrated in FIG. 1 showing the exposure pattern generated in the recording plane by the interferometric line pattern.

The present apparatus is readily adapted to produce an exposure over an extended recording plane without disturbing the phase relationship between the superimposed beams at the read-out plane. To accomplish this result, the upper and lower edges 39 and 40 of horizontal sweep plate 36 are made opaque and the plate rotated by motor means 45 acting through pinion 46 and 47. Rotation of the plate 36 in this manner causes the interference pattern to sweep across the recording plane in a horizontal direction, that is, across the plane in the direction of the (X) coordinate. Plate 35 is periodically repositioned in the original light beam 11 by means of a stepping motor 50 acting through pinion 51 and gear 52. In practice, the stepping motor is actuated by conventional means as plate 36 sweeps through one-half of a complete rotational cycle to reposition the pattern in the (y) direction. The movement of plate 35 is indexed so that each subsequent horizontal sweep of the fringe pattern acts upon a region parallel to the prior sweep in the read-out plane. The centers of the two illuminated spots thus follow the path shown by the dark line in FIG. 5, and cause an overall exposure pattern as depicted by the shaded area. As diagrammatically illustrated in FIG. 3, the movement of the drive motors can be controlled to produce a uniform time average exposure (E) in the recording plane.

It should be noted that this particular system is extremely efficient in that a high percentage of the total input energy is utilized to produce a stable exposure in the read-out plane. While this invention has been described with specific reference to the structure disclosed it should be clear that the geometry of the present system can be changed so long as the difference in lengths of the two light beams energizing from the beam splitter remain within the coherent length of the light source. The present invention is not confined to the specific details as set forth in this application and is intended to cover much modifications and changes as may come within the scope of the following claims.

What is claimed is:

1. The method of scanning an interferometric line pattern over an extended exposure region including
    providing a source of illumination for producing a collimated beam of coherent light,
    splitting the light from said source into at least two discrete beams of light,
    superimposing the split beams of light in a recording plane to create an interferometric line pattern in a region of said recording plane, and
    displacing the original unsplit light beam to a second beam position substantially parallel to the original beam position whereby the illuminated interferometric line pattern in the recording plane is moved and the phase relationship between the superimposed beams of light in the recording plane remains unchanged.

2. The method of claim 1 wherein the original beam of light is displaced in more than one plane.

3. The method of claim 1 wherein the original beam of light is displaced in two planes, the planes being substantially normal to each other.

4. Apparatus for scanning an interferometric line pattern over an extended exposure region including
    a source of illumination for producing a coherent beam of collimated light,
    means to split the light from said source into at least two discrete beams of light,
    means to superimpose the split light beams in a recording plane to create an interferometric line pattern in a region of said readout plane, and
    optical means arranged to receive the unsplit light from said source and to displace the received light to an offset beam position substantially parallel to the received beam position whereby the interferometric line pattern is moved in the recording plane and the phase relationship of the superimposed light beams in said plane remains unchanged.

5. The apparatus of claim 4 wherein the source of light comprises a laser for producing substantially monochromatic light.

6. The apparatus of claim 5 wherein the difference between each of the light beams after splitting is within the coherent length of the light source.

7. The apparatus of claim 6 wherein said optical means comprises at least one transparent plate having a flat light entrance surface and a flat light exit surface substantially parallel to each other and being arranged to be obliquely positioned in the unsplit light beam wherein the light beam leaving said plate is offset and substantially parallel with the light beam entering said plate.

8. The apparatus of claim 4 wherein said optical means comprises
    a first glass plate having flat and parallel light entrance and light exit surfaces being obliquely repositionable in the unsplit light beam from said source, and
    a second glass plate having flat and parallel light entrance and light exit surfaces being obliquely repositionable in the light beam leaving said first plate.

9. The apparatus of claim 4 further including projection lenses operatively associated with each of the split light beams to expand the illuminated region in the recording plane and to change the original planar light wave front to a spherical wave front.

10. The apparatus of claim 9 further including a spatial filter positioned between the projections lenses and the recording plane to prevent unwanted extraneous noise from being recorded at said recording plane.

* * * * *